United States Patent
Hicok et al.

(10) Patent No.: US 7,383,352 B2
(45) Date of Patent: Jun. 3, 2008

(54) METHOD AND APPARATUS FOR PROVIDING AN INTEGRATED NETWORK OF PROCESSORS

(75) Inventors: Gary D. Hicok, Mesa, AZ (US); Robert A. Alfieri, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/473,832

(22) Filed: Jun. 23, 2006

(65) Prior Publication Data

US 2008/0104271 A1    May 1, 2008

Related U.S. Application Data

(62) Division of application No. 10/144,658, filed on May 13, 2002, now abandoned.

(51) Int. Cl.
   *G06F 13/00* (2006.01)
(52) U.S. Cl. .................. 709/238; 709/230; 709/250
(58) Field of Classification Search .............. 709/230, 709/236, 238, 246, 250
   See application file for complete search history.

(56) References Cited

U.S. PATENT DOCUMENTS

| | | | |
|---|---|---|---|
| 5,349,679 A | 9/1994 | Nakayama | |
| 5,524,250 A | 6/1996 | Chesson et al. | |
| 5,630,172 A | 5/1997 | Ami et al. | |
| 5,630,174 A | 5/1997 | Stone, III et al. | |
| 5,742,773 A | 4/1998 | Blomfield-Brown et al. | |
| 5,797,028 A | 8/1998 | Gulick et al. | |
| 5,812,800 A * | 9/1998 | Gulick et al. | 710/306 |
| 5,826,027 A | 10/1998 | Pedersen et al. | |
| 5,884,025 A | 3/1999 | Baehr et al. | |
| 5,909,546 A * | 6/1999 | Osborne | 709/212 |
| 5,974,496 A | 10/1999 | Miller | |
| 5,987,627 A * | 11/1999 | Rawlings, III | 714/48 |
| 6,032,253 A | 2/2000 | Cashman et al. | |
| 6,034,963 A | 3/2000 | Minami et al. | |
| 6,092,124 A | 7/2000 | Priem et al. | |
| 6,094,485 A | 7/2000 | Weinstein et al. | |
| 6,097,955 A | 8/2000 | Bhat | |
| 6,101,170 A | 8/2000 | Doherty et al. | |
| 6,157,955 A | 12/2000 | Narad et al. | |

(Continued)

FOREIGN PATENT DOCUMENTS

AU        4563399 A        1/2000

(Continued)

OTHER PUBLICATIONS

Ito et al., "A Multiprocessor Approach for Meeting the Processing Requirements of OSI," IEEE Journal on Selected Areas in Communication, vol. 11, No. 2, Feb. 1993.

(Continued)

*Primary Examiner*—Viet D. Vu
(74) *Attorney, Agent, or Firm*—Patterson & Sheridan, LLP

(57) ABSTRACT

A novel network architecture that integrates the functions of an internet protocol (IP) router into a network processing unit (NPU) that resides in a host computer's chipset such that the host computer's resources are perceived as separate network appliances. The NPU appears logically separate from the host computer even though, in one embodiment, it is sharing the same chip.

25 Claims, 5 Drawing Sheets

U.S. PATENT DOCUMENTS

| | | |
|---|---|---|
| 6,226,680 B1 | 5/2001 | Boucher et al. |
| 6,327,660 B1 | 12/2001 | Patel |
| 6,343,086 B1 | 1/2002 | Katz et al. |
| 6,345,072 B1 | 2/2002 | Liu et al. |
| 6,389,419 B1 | 5/2002 | Wong et al. |
| 6,401,117 B1 | 6/2002 | Narad et al. |
| 6,421,730 B1 | 7/2002 | Narad et al. |
| 6,449,647 B1 | 9/2002 | Colby et al. |
| 6,542,992 B1 | 4/2003 | Peirce, Jr. et al. |
| 6,646,999 B1 | 11/2003 | Kato et al. |
| 6,704,794 B1 | 3/2004 | Kejriwal et al. |
| 6,714,985 B1 | 3/2004 | Malagrino et al. |
| 6,735,647 B2 | 5/2004 | Boyd et al. |
| 6,757,746 B2 | 6/2004 | Boucher et al. |
| 6,781,955 B2 | 8/2004 | Leung |
| 6,785,780 B1* | 8/2004 | Klein et al. ............... 711/148 |
| 6,832,261 B1 | 12/2004 | Westbrook et al. |
| 6,888,835 B2 | 5/2005 | Reeve |
| 6,907,042 B1 | 6/2005 | Oguchi |
| 6,912,522 B2 | 6/2005 | Edgar |
| 6,944,706 B2 | 9/2005 | Schain et al. |
| 6,950,862 B1 | 9/2005 | Puthiyandyil et al. |
| 7,010,727 B1 | 3/2006 | Stucker |
| 7,017,175 B2 | 3/2006 | Alao et al. |
| 7,027,443 B2 | 4/2006 | Nichols et al. |
| 7,116,640 B2 | 10/2006 | Tasman et al. |
| 7,136,926 B1 | 11/2006 | Iyer et al. |
| 7,149,222 B2 | 12/2006 | Wiryaman et al. |
| 7,177,310 B2 | 2/2007 | Inagaki et al. |
| 2002/0009083 A1 | 1/2002 | Ambe et al. |
| 2002/0059451 A1 | 5/2002 | Haviv |
| 2002/0083344 A1 | 6/2002 | Vairavan |
| 2002/0128986 A1* | 9/2002 | Stutz ........................... 705/401 |
| 2003/0005103 A1 | 1/2003 | Narad et al. |
| 2003/0035431 A1 | 2/2003 | Guse |
| 2003/0041177 A1 | 2/2003 | Warschko et al. |
| 2003/0046423 A1 | 3/2003 | Narad et al. |
| 2003/0061332 A1 | 3/2003 | Narad et al. |
| 2003/0142823 A1 | 7/2003 | Swander et al. |
| 2003/0145226 A1 | 7/2003 | Bruton, III et al. |
| 2003/0145230 A1 | 7/2003 | Chiu et al. |
| 2003/0154399 A1 | 8/2003 | Zuk et al. |
| 2004/0030927 A1 | 2/2004 | Zuk |
| 2004/0114589 A1 | 6/2004 | Alfieri et al. |
| 2004/0139267 A1* | 7/2004 | Gillespie et al. ............ 710/306 |
| 2004/0143655 A1 | 7/2004 | Narad et al. |
| 2004/0148382 A1 | 7/2004 | Narad et al. |
| 2005/0281288 A1 | 12/2005 | Banerjee et al. |

FOREIGN PATENT DOCUMENTS

| | | |
|---|---|---|
| EP | 1 193 940 A2 | 3/1995 |
| EP | 1090485 A1 | 4/2001 |
| EP | 1 284 561 A2 | 2/2003 |
| WO | WO 99/66680 A1 | 12/1999 |
| WO | WO 01/65799 A1 | 9/2001 |
| WO | WO 02/059757 A1 | 8/2002 |

OTHER PUBLICATIONS

Omondi, Amos R. et al., "Performance of a Context Cache for a Multithreaded Pipeline," Journal of Systems Architecture, Elsevier Science Publishers B.V., Amsterdam, NL, Dec. 1, 1998, vol. 45, No. 4, pp. 305-322.

Smith, Richard E., "Internet-Kryptographie," Addison Wesley Longman, Inc. XP002295926, 1998.

Mogul et al., "Path MTU Discovery," pp. 1-19, RFC 1191, Stanford University, Nov. 1990.

Information Sciences Institute, University of Southern California, Marina del Rey, CA, USA, Sep. 1981: "Internet Protocol," RFC 791, Protocol Specification for the Defense Advanced Research Projects Agency (DARPA).

Orda et al., "Optimal Packet Fragmentation in Computer Networks," Israel Institute of Technology, Haifa, Israel, Mar. 1994.

* cited by examiner

METHOD AND APPARATUS FOR PROVIDING AN INTEGRATED NETWORK OF PROCESSORS

CROSS-REFERENCE TO RELATED APPLICATIONS

This application is a divisional of U.S. patent application Ser. No. 10/144,658, filed May 13, 2002, now abandoned. The aforementioned related patent applications is herein incorporated by reference.

BACKGROUND OF THE INVENTION

The present invention relates to a novel network architecture. More specifically, the present invention integrates the functions of an internet protocol (IP) router into a network processing unit that resides in a host computer's chipset such that the host computer's resources are perceived as separate network appliances.

FIG. 1 illustrates traditional internal content sources and data pipes where the data routing function is performed by a host central processing unit (CPU) and its operating system (OS) 110. Namely, the host computer may comprise a number of storage devices 120, a plurality of media engines 130, and a plurality of other devices that are accessible via input/output ports 140, e.g., universal serial bus (USB) and the like. In turn, the host computer may access a network 150 via application programming interfaces (APIs) and a media access controller (MAC).

However, a significant drawback of this data routing architecture is that the host computer's resources or devices are only accessible with the involvement of the host CPU/OS. Typically, accessing the host resources from external computers is either prohibited or it is necessary to request access through the host computer using high-level protocols. If the host CPU/OS is overtaxed, a substantial latency will exist where data flow may be stuck in the OS stacks.

Therefore, a need exists for a novel network architecture that allows a host computer's resources to be perceived as separate network appliances and are accessible without the interference of the host computer's CPU/OS.

SUMMARY OF THE INVENTION

The present invention is a novel network architecture. More specifically, the present invention integrates the functions of an internet protocol (IP) router into a network processing unit (NPU) that resides in a host computer's chipset such that the host computer's resources are perceived as separate network appliances. The NPU appears logically separate from the host computer even though, in one embodiment, it is sharing the same chip. A host computer's "chipset" is one or more integrated circuits coupled to a CPU that provide various interfaces (e.g., main memory, hard disks, floppy, USB, PCI, etc), exemplified by Intel's Northbridge and Southbridge integrated circuits.

In operation, the host computer has a virtual port (i.e., host MAC) that is in communication with the network processing unit and communicates with the NPU as if it is an external network appliance using standard networking protocols. In one embodiment, the host computer communicates via the NPU with one or more auxiliary or dedicated processing units that are deployed to perform dedicated tasks. These auxiliary processing units can be part of the host or can be deployed separate from the host to meet different application requirements. For example, some of these auxiliary processing units include, but are not limited to, a graphics processing unit (GPU), an audio processing unit (APU), a video processing unit (VPU), a storage processing unit (SPU), and a physics processing unit (PPU). The present disclosure refers to these auxiliary processing units as XPU, where the "X" is replaced to signify a particular function performed by the processing unit. Finally, the network processing unit itself is an XPU because it can, in addition to routing packets among XPUs, perform various processing accelerations on these packets, such as authentication, encryption, compression, TCP, IPSecNPN/PPP encapsulation and so on.

One unique aspect of the present Invention is that the XPUs have logically direct attachments to the NPU which effectively serves as an integrated router, thereby allowing XPUs to be seen as separate network appliances. Since these auxiliary processing units have first-class status in this logical network architecture, they are allowed to communicate with each other or with any external computer (e.g., via another NPU) directly using standard internet protocols such as IP, TCP, UDP and the like without the involvement of the host CPU/OS. Using this novel architecture, the NPU provides both local (or host) access and remote access acceleration in a distributed computing environment.

Furthermore, by virtualizing the remaining resources of the host computer, such as its physical memory, ROM, real-time clocks, interrupts, and the like, the present invention allows a single chipset to provide multiple, virtual host computers with each being attached to this NPU. Each of these virtual computers or virtual host may run its own copy of an identical or different operating system, and may communicate with other virtual computers and integrated networked appliances using standard networking protocols. Effectively, the present invention embodies its own hardware-level operating system and graphical user interface (GUI) that reside below the standard host operating system and host computer definition, and allow the computer user to easily configure the network or to switch from one virtual computer to another without changing the standard definition of that host computer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
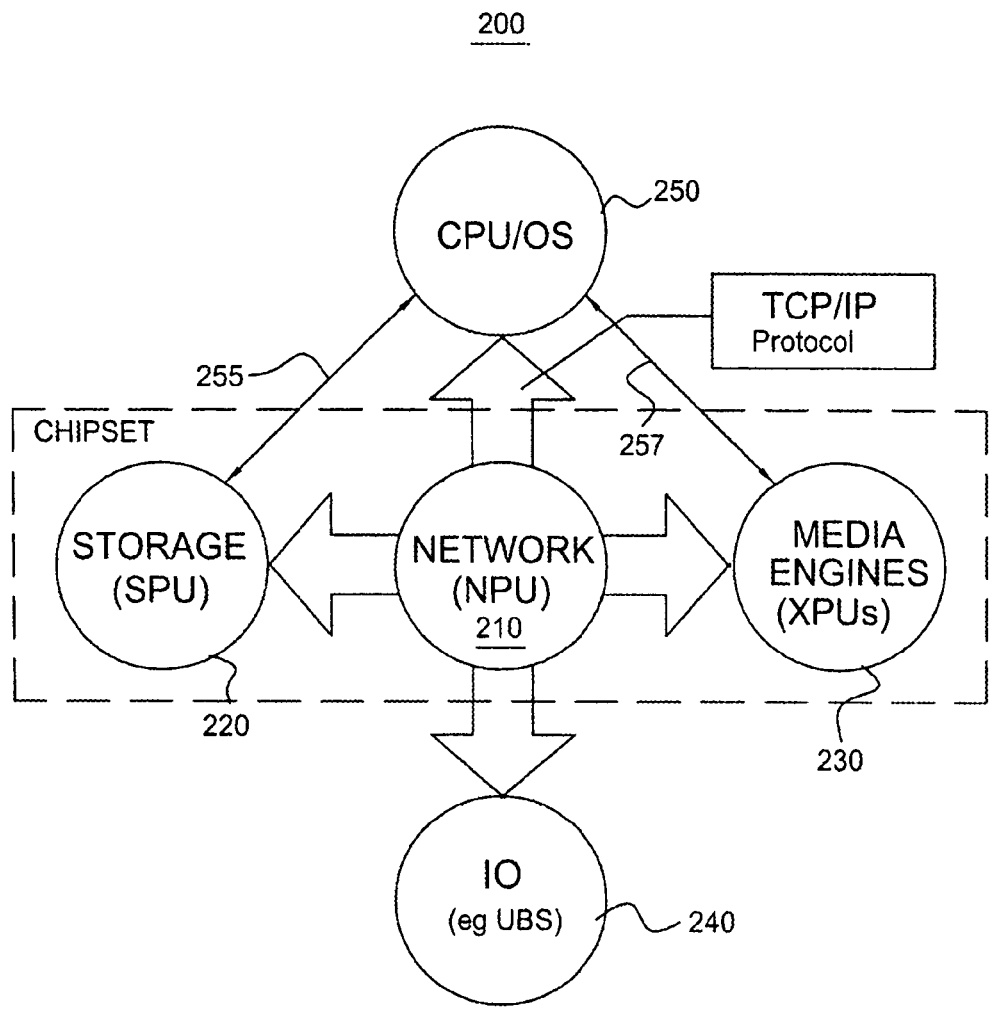
FIG. 2 illustrates a block diagram of novel internal content sources and data pipes of the present invention.

FIG. 2 illustrates a block diagram of novel internal content sources and data pipes 200 of the present invention.

Figure 1:
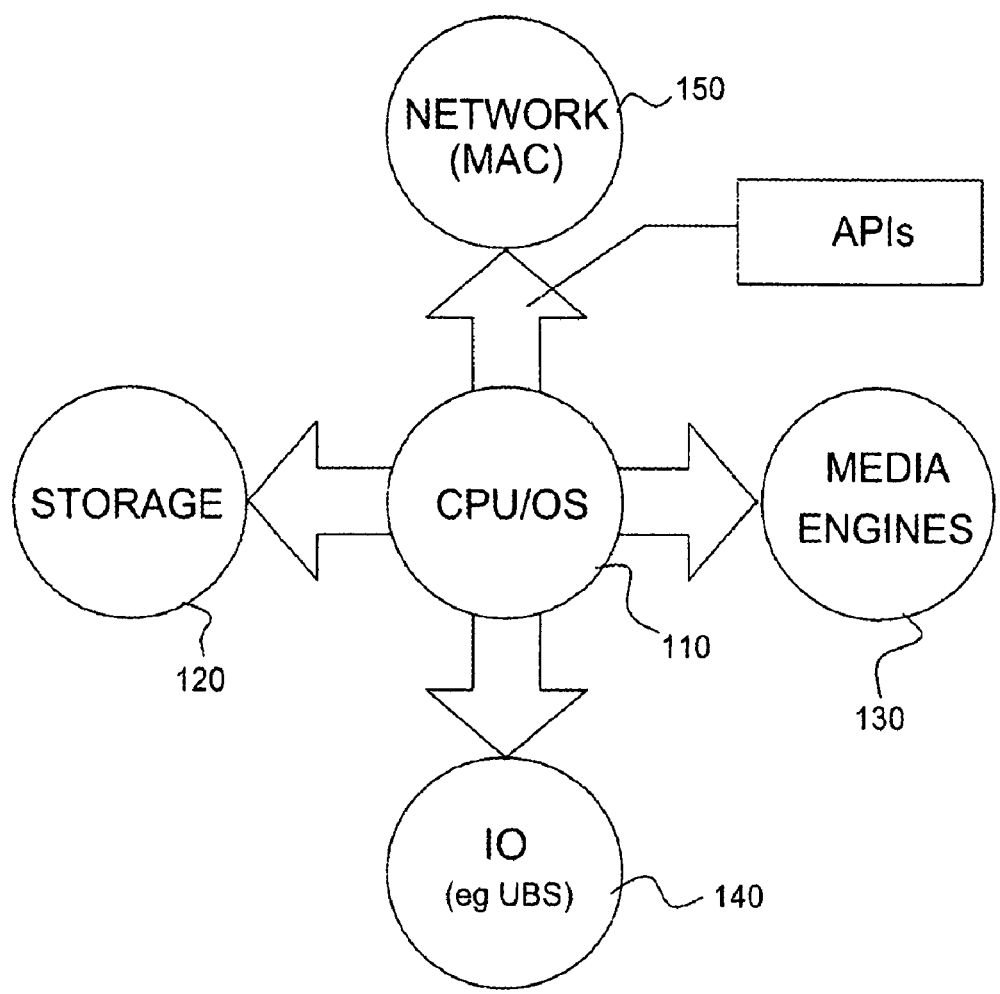
FIG. 1 illustrates a block diagram of conventional internal content sources and data pipes.

Unlike FIG. 1, the present network architecture has a network processing unit 210 of the present invention at the center of the internal content sources and data pipes. The host CPU/OS 250 is no longer central to the data routing scheme. One advantage of this new architecture is that the NPU 210 provides both local or host access and remote access acceleration.

An operating system is any software platform for application programs; typical examples are Microsoft Windows, Unix, and Apple Macintosh OS. An operating system can be run on top of another operating system (an example of a virtual operating system) or another underlying software platform, possibly as an application program.

In operation, the host CPU/OS 250 has a virtual port (i.e., host MAC) that is in communication with the network processing unit 210 and communicates with the NPU as if it is an external network appliance using standard networking protocols, e.g., TCP/IP protocols. In one embodiment, the host computer communicates via the NPU with one or more auxiliary or dedicated processing units 220, 230 that are deployed to perform dedicated tasks. These auxiliary processing units can be part of the host or can be deployed separate from the host to meet different application requirements.

For example, some of these auxiliary processing units include, but are not limited to, a graphics processing unit (GPU), an audio processing unit (APU), a video processing unit (VPU), a physics processing unit (PPU) and a storage processing unit (SPU) 220. Some of these auxiliary processing units can be deployed as part of the media engines 230, whereas the SPU 220 is deployed with the storage devices of the host. Finally, the network processing unit itself is an XPU because it can, in addition to routing packets among XPUs, perform various processing accelerations on these packets, such as authentication, encryption, compression, TCP, IPSecNPN/PPP encapsulation and so on.

In one embodiment, the NPU 210 is a network router appliance that resides inside the same "box" or chassis as the host computer 250, i.e., typically within the same chipset. The NPU serves to connect various other "XPUs" that performed dedicated functions such as:

1) Storage Processing Unit (SPU) is an auxiliary processing unit that implements a file system, where the file system can be accessed locally by the host or remotely via the NPU's connection to the outside world. The SPU is a special XPU because it behaves as an endpoint for data storage. Streams can originate from an SPU file or terminate at an SPU file.

2) Audio Processing Unit (APU) is an auxiliary processing unit that implements audio affects on individual "voices" and mixes them down to a small number of channels. APU also performs encapsulation/decapsulation of audio packets that are transmitted/received over the network via the NPU.

3) Video Processing Unit (VPU) is an auxiliary processing unit that is similar to the APU except that it operates on compressed video packets (e.g., MPEG-2 compressed), either compressing them or uncompressing them. The VPU also performs encapsulations into bitstreams or network video packets.

4) Graphics Processing Unit (GPU) is an auxiliary processing unit that takes graphics primitives and produces (partial) frame buffers. The GPU is a special XPU because it acts as an endpoint for rendered graphics primitives. Streams can terminate at a GPU frame buffer or originate as raw pixels from a frame buffer.

5) Physics Processing Unit (PPU) is an auxiliary processing unit that takes object positions, current velocity vectors, and force equations, and produces new positions, velocity vectors, and collision information.

6) Network Processing Unit (NPU) is itself an XPU because it can, in addition to routing packets among XPUs, perform various processing accelerations on these packets, such as authentication, encryption, compression, TCP, IPSecNPN/PPP encapsulation and the like.

Some of the above XPUs have a number of commonalities with respect to their association with the host 250 and the NPU 210. First, an XPU can be accessed directly by the host CPU and O/S 250 directly as a local resource. Namely, communication is effected by using direct local communication channels.

Figure 3:
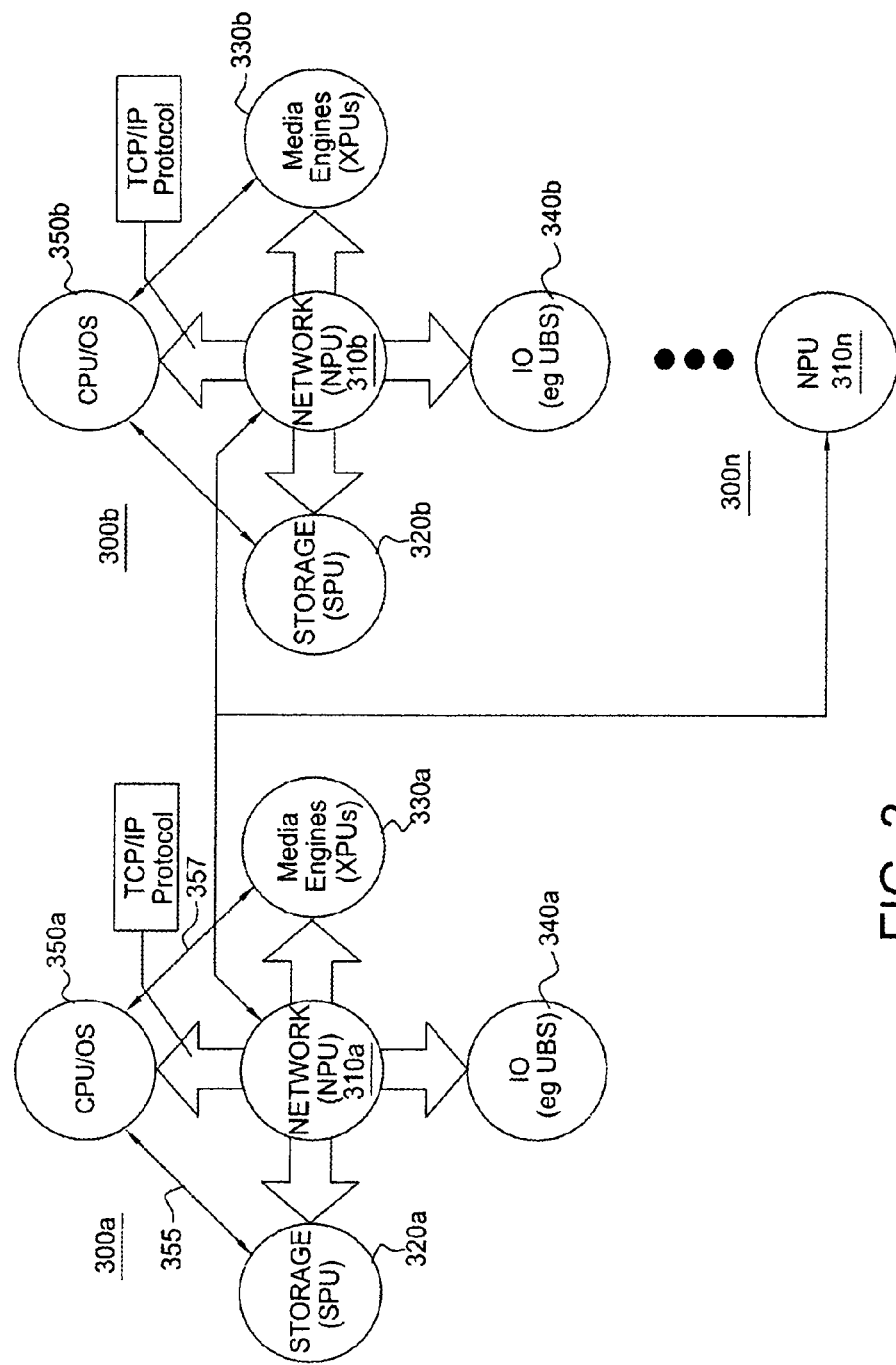
FIG. 3 illustrates a block diagram where a network of host computers are in communication with each other via a plurality of network processing units.

Second, an XPU can be placed on the network via the NPU and accessed remotely from other network nodes (as shown in FIG. 3 below). This indicates that an XPU is capable of processing information that is encapsulated in network packets.

Third, an XPU can be accessed as a "remote" node even from the local host. Namely, communication is effected via the NPU by using network protocols.

Fourth, an XPU is always in an "on" state (like most appliances) even when the host (CPU+O/S) is in the "off" state. This unique feature allows the XPUs to operate without the involvement of the host CPU/OS, e.g., extracting data from a disk drive of the host without the involvement of the host. More importantly, the host's resources are still available even though the CPU/OS may be in a dormant state, e.g., in a sleep mode.

Fifth, an XPU has at least two sets of processing queues, one for non-real-time packets and at least one for real-time packets. This duality of queues combined with similar real-time queues in the NPU, allows the system of NPU and XPUs to guarantee latencies and bandwidth for real-time streams.

Sixth, an XPU has two software (SW) drivers, one that manages the host-side connection to the XPU, and one that manages the remotely-accessed component of the XPU. In operation, the SW drivers communicate with the XPU using abstract command queues, called push buffers (PBs). Each driver has at least one PB going from the driver to the XPU and at least one PB going from the XPU to the driver. Push buffers are described in U.S. Pat. No. 6,092,124, and is herein incorporated herein by reference.

Seventh, an XPU can also be accessed on the host side directly by a user-level application. Namely, this involves lazy-pinning of user-space buffers by the O/S. Lazy-pinning means to lock the virtual-to-physical address translations of memory pages on demand, i.e., when the translations are needed by the particular XPU. When the translations are no longer needed, they can be unlocked, allowing the operating system to page out those pages. The virtual-to-physical mappings of these buffers are passed to the XPU. A separate pair of PBs are linked into the user's address space and the O/S driver coordinates context switches with the XPU.

Although the present invention discloses the use of a network processing unit 210 to perform routing functions without the involvement of the CPU/OS, the CPU/OS 250 nevertheless still has an alternate direct communication channel 255 with its resources, e.g., storage devices. This provides the host CPU/OS with the option of communicating with its resources or media engines via the NPU or directly via local access channels 255 or 257.

In fact, although the CPU/OS is not involved with the general routing function, in one embodiment of the present invention, exception routing issues are resolved by the host CPU/OS. For example, if the NPU receives a packet that it is unable to process, the NPU will forward the packet to the host CPU/OS for resolution. This limited use of the CPU/OS serves to accelerate host processing, while retaining the option to more judiciously use the processing power of the host CPU/OS to resolve difficult issues.

Additionally, the host resources may also be accessed via the NPU without the involvement of the host CPU/OS 250 via input/output communication channel 240, e.g., via an USB. For example, the present architecture can virtualize the remaining resources of the host computer 250, such as its physical memory, read only memory (ROM), real-time clocks, interrupts, and so on, thereby allowing a single chipset to provide multiple virtual hosts with each host being attached to the NPU 210.

One unique aspect of the present Invention is that the XPUs have logically direct attachments to the NPU that effectively serves as an integrated router, thereby allowing XPUs to be seen as separate network appliances. Since these auxiliary processing units have first-class status in this logical network architecture, they are allowed to communicate with each other or with any external computer (e.g., via another NPU) directly using standard internet protocols such as IP, TCP, UDP and the like without the involvement of the host CPU/OS. Using this novel architecture, the NPU provides both local (or host) access and remote access acceleration in a distributed computing environment.

FIG. 3 illustrates a block diagram where a network of host computers 300a-n are in communication with each other via a plurality of network processing units 310a-n. This unique configuration provides both host access and remote access acceleration. The accelerated functions can be best understood by viewing the present invention in terms of packetized streams.

Figure 4:
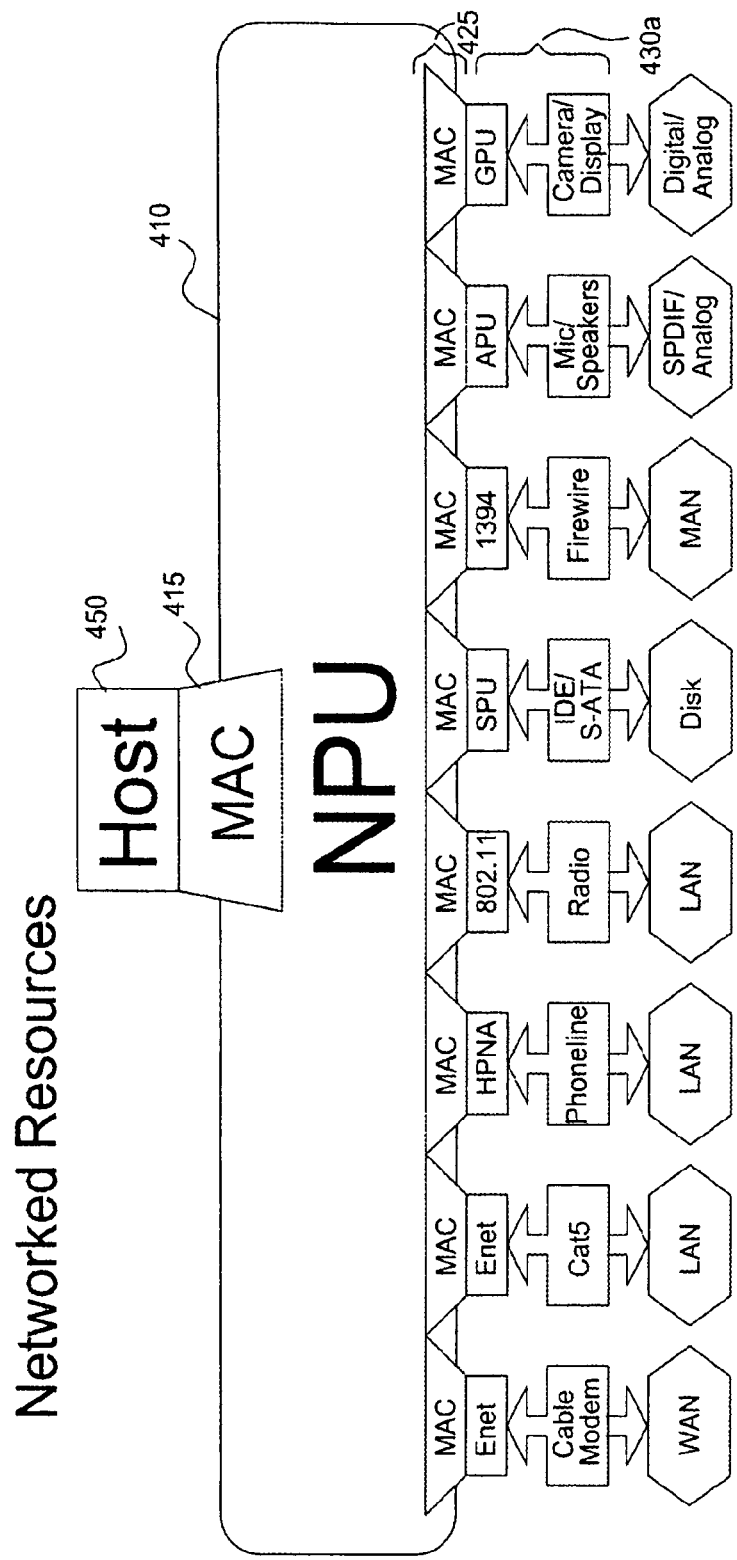
FIG. 4 illustrates a block diagram where a host computer's resources are networked via a network processing unit of the present invention.

It is best to view this system of NPU and XPUs in the context of streams of packetized data that flow within this system. There are various types of streams that are allowed by the system. In this discussion, the term "host" means the combination of host CPU and memory in the context of the O/S kernel or a user-level process. The term "node" refers to a remote networked host or device that is attached to the NPU via a wired or wireless connection to a MAC that is directly connected to the NPU (e.g., as shown in FIG. 4 below).

A host-to-XPU stream is a stream that flows directly from the host 350a to the XPU 330a. This is a typical scenario for a dedicated XPU (e.g., a dedicated GPU via communication path 357). The stream does not traverse through the NPU 310a.

An XPU-to-host stream is a stream that flows directly from the XPU to the host. One example is a local file being read from the SPU 320a via path 355. The stream does not traverse through the NPU 310a.

A host-to-XPU-to-host stream is a stream that flows from host 350a to an XPU 330a for processing then back to the host 350a. One example is where the host forwards voice data directly to the APU for processing of voices into final mix buffers that are subsequently returned to the host via path 357. The stream does not traverse through the NPU 310a.

A host-to-NPU-to-XPU stream is a networked stream that flows from the host 350a via NPU 310a to an XPU 330a or 320a. The three parties transfer packetized data using standard networking protocols, e.g., TCP/IP.

An XPU-to-NPU-to-Host is a networked stream that flows from an XPU 330a or 320a via the NPU 310a to the host 350a. The three parties transfer packetized data using standard networking protocols, e.g., TCP/IP.

A host-to-NPU-to-XPU-to-NPU-to-host is a networked stream that is the combination of the previous two streams. The three parties transfer packetized data using standard networking protocols, e.g., TCP/IP.

A host-to-NPU-to-Node is a networked stream that flows from the host 350a via the NPU 310a to a remote node (e.g., NPU 310b). This allows a local host 350a to communicate and access XPUs 330b of another host via a second NPU 310b.

A Node-to-NPU-to-Host is a reverse networked stream where the stream flows from a remote node (e.g., NPU 310b) via the NPU 310a to the host 350a. This allows a remote NPU 350b to communicate with a local host 350a via a local NPU 310a.

A Node-to-NPU-to-XPU is a networked stream that flows from a remote node 350b via the NPU 350a to an XPU 330a where it terminates. This allows a remote NPU 310b to communicate with a local XPU 330a via a local NPU 310a.

An XPU-to-NPU-to-Node is a networked stream that flows from an XPU 330a where it originates to a remote node (e.g., NPU 310b) via local NPU 310a.

A Node0-to-NPU-to-XPU-to-NPU-to-Node1 is a combination of the previous two streams. It should be noted that Node0 and Node1 may be the same or different. For example, Node0 is 310a; NPU is 310b; XPU is 330b; NPU is 310b; and Node1 is 310n. Alternatively, Node0 is 310a; NPU is 310b; XPU is 330b; NPU is 310b; and Node1 is 310a.

A {Host,Node0,XPU0}-to-NPU-to-XPU1-to-NPU-to-XPU2-to-NPU-to-{Host, Node1, XPU3} is a stream that originates from the host, a remote node, or an XPU, passes through the NPU to another XPU for some processing, then passes through the NPU to another XPU for some additional processing, then terminates at the host, another remote node, or another XPU. It should be clear that the present architecture of a network of integrated processing units provides a powerful and flexible distributed processing environment, where both host access and remote access acceleration are greatly enhanced.

Under the present architecture, numerous advantages are achieved. First, it is beneficial to tightly integrate other computers and network appliances into the same chipset. Second, it is very advantageous to offload a host computer's I/O functions into a distributed network of intelligent processors, where traditional latencies associated with overtaxed CPU/OS are resolved. Third, it is advantageous to provide these auxiliary I/O processors with first-class network-appliance status within the chipset (optionally illustrated in FIG. 2 with dash lines) without changing the definition of the host computer. Fourth, it is advantageous to allow these auxiliary I/O processors to be shared among the host computer, external computers, and internal and external network appliances. Fifth, it is advantageous to allow the remaining resources of the host computer to be virtualized so that multiple virtual copies of the host computer may be embodied in the same chipset, while sharing the network of intelligent auxiliary I/O processors. Finally, it is advantageous to use a hardware-level operating system and graphical user interface (GUI) that allow the user to configure the network and seamlessly switch among virtual copies of the host computer or virtual host.

In one embodiment of the present invention, real-time media streaming is implemented using the above described network of integrated processing units. Specifically, media streaming typically involves multiple software layers. Thus, latencies can be unpredictable, particularly when the software runs on a general-purpose computer. More importantly, media streaming typically has a severe adverse impact on other applications running on the host computer.

However, by attaching media devices such as an APU or GPU to an NPU+SPU combination, it is now possible to minimize and guarantee latencies as well as offload the main host CPU. For example, referring to FIG. 3, control requests may arrive from a remote recipient 350b (typically attached wireless). These control requests may include play, stop, rewind, forward, pause, select title, and so on. Once the stream is set up, the raw data can be streamed directly from a disk managed by the SPU 320a through the NPU 310a to the destination client. Alternatively, the data may get preprocessed by the GPU 330a or APU 330a prior to being sent out via the NPU 310a. One important aspect again is that real-time media streaming can take place without host CPU 350a involvement. Dedicated queuing throughout the system will guarantee latencies and bandwidth.

This media streaming embodiment clearly demonstrates the power and flexibility of the present invention. One practical implementation of this real-time media streaming embodiment is within the home environment, where a centralized multimedia host server or computer has a large storage device that contains a library of stored media streams or it may simply be connected to a DVD player, a "PVR" (personal video recorder) or "DVR" (digital video recorder). If there are other client devices throughout the home, it is efficient to use the above network architecture to implement real-time media streaming, where a media stream from a storage device of the host computer can be transmitted to another host computer or a television set in a different part of the home. Thus, the real-time media streaming is implemented without the involvement of the host computer and with guaranteed latencies and bandwidth.

FIG. 4 illustrates a block diagram where a host computer's resources are networked via a network processing unit 410 of the present invention. Specifically, a host 450 communicates with the NPU 410 via a MAC 415 (i.e., a host MAC). In turn, a plurality of XPUs and other host resources 430a are connected to the NPU via a plurality of MACs 425 that interface with a MAC Interface (MI) (not shown) of the NPU. One example of an NPU is disclosed in U.S. patent application entitled "A Method And Apparatus For Performing Network Processing Functions" with Ser. No. 10/319,791.

Figure 5:
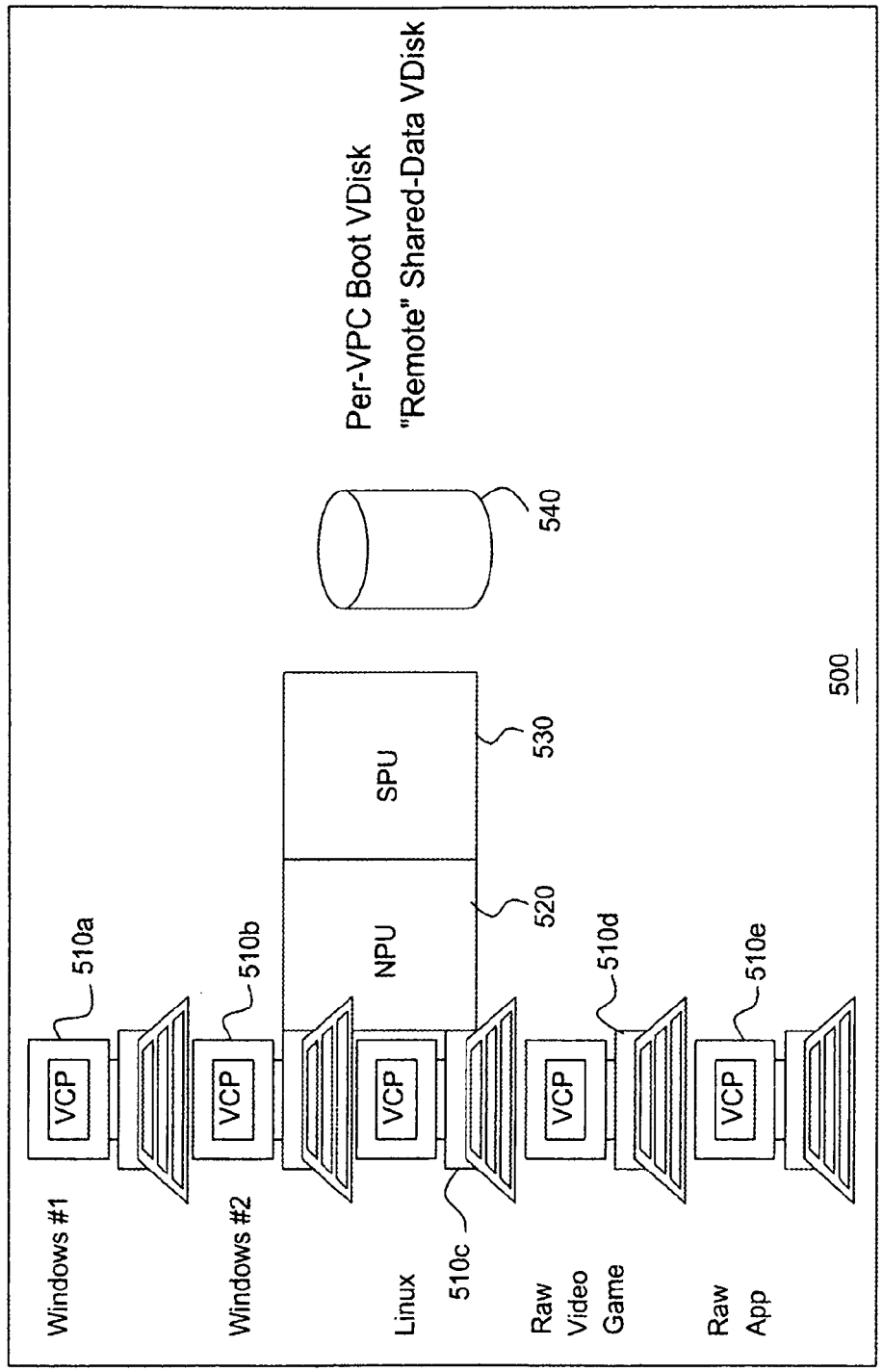
FIG. 5 illustrates a block diagram of a network of virtual personal computers in communication with a network processing unit of the present invention.

FIG. 5 illustrates a block diagram of a network of virtual personal computers or virtual hosts that are in communication with a network processing unit 520 of the present invention. More specifically, FIG. 5 illustrates a network of virtual personal computers (VPCs) in a single system (or a single chassis) 500, where the system may be a single personal computer, a set top box, a video game console or the like.

In operation, FIG. 5 illustrates a plurality of virtual hosts 510a-e, which may comprise a plurality of different operating systems (e.g., Microsoft Corporation's Windows (two separate copies 510a and 510b), and Linux 510c), a raw video game application 510d or other raw applications 510e, where the virtual hosts treat the storage processing unit 530 as a remote file server having a physical storage 540. In essence, one can perceive FIG. 5 as illustrating a "network of VPCs in a box".

In one embodiment, the NPU 520 manages multiple IP addresses inside the system for each VPC. For example, the NPU 520 may be assigned a public IP address, whereas each of the VPCs is assigned a private IP address, e.g., in accordance with Dynamic Host Configuration Protocol (DHCP). Thus, each of the VPCs can communicate with each other and the SPU using standard networking protocols. Standard network protocols include, but are not limited to: TCP; TCP/IP; UDP; NFS; HTTP; SMTP; POP; FTP; NNTP; CGI; DHCP; and ARP (to name only a few that are know in the art).

It should be understood that the XPUs of the present invention can be implemented as one or more physical devices that are coupled to the host CPU through a communication channel. Alternatively, the XPUs can be represented and provided by one or more software applications (or even a combination of software and hardware, e.g., using application specific integrated circuits (ASIC)), where the software is loaded from a storage medium, (e.g., a ROM, a magnetic or optical drive or diskette) and operated in the memory of the computer. As such, the XPUs (including associated methods and data structures) of the present invention can be stored and provided on a computer readable medium, e.g., ROM or RAM memory, magnetic or optical drive or diskette and the like. Alternatively, the XPUs can be represented by Field Programmable Gate Arrays (FPGA) having control bits.

Although various embodiments which incorporate the teachings of the present invention have been shown and described in detail herein, those skilled in the art can readily devise many other varied embodiments that still incorporate these teachings. In the claims, elements of method claims are listed in a particular order, but no order for practicing of the invention is implied, even if elements of the claims are numerically or alphabetically enumerated.

What is claimed is:

1. A computing device comprising:
   a central processing unit (CPU) executing an operating system; and
   a chipset including a network processing unit (NPU) that is in communication with the CPU and at least first and second auxiliary processing units,
   wherein the first and second auxiliary processing units can communicate application data directly to each other through the NPU using standard networking protocols, including Internet Protocol (IP), Transmission Control Protocol (TCP), and User Datagram Protocol (UDP), without involvement from the CPU and without involvement from the operating system,
   wherein the NPU perceives the first and the second auxiliary processing units as separate network appliances that provide both local access and remote access in a distributed computing environment, and
   wherein the NPU is logically separate from the operating system and the CPU.

2. The computing device according to claim 1, further comprising a virtual port that communicates between the CPU and the NPU, wherein the virtual port communicates with the NPU as if the NPU is an external network appliance, using standard networking protocols.

3. The computing device according to claim 2, wherein the NPU is configured as a network router that can route packets received from one of the auxiliary processing units to another one of the auxiliary processing units.

4. The computing device according to claim 3, wherein the NPU is further configured to perform one of various processing accelerations on the packets.

5. The computing device according to claim 4, wherein the processing accelerations include authentication, encryption, compression, and encapsulation.

6. The computing device according to claim 1, wherein the first and the second auxiliary processing units are in an "on" state even when the operating system and the CPU are in an "off" state, such that the first and the second auxiliary processing units can extract data from a disk drive of the computing device without involvement from the operating system and the CPU.

7. The computing device according to claim 1, further comprising an I/O device in communication with the NPU.

8. The computing device according to claim 7, wherein the NPU is configured as a network router that can route packets from one of the auxiliary processing units to the I/O device and packets received from the I/O device to one of the auxiliary processing units.

9. The computing device according to claim 1, wherein the first auxiliary processing unit is a storage processing unit and the second auxiliary processing unit is a graphics processing unit.

10. The computing device according to claim 9, wherein storage processing unit is further configured for direct communication with the CPU and the graphics processing unit is further configured for direct communication with the CPU.

11. A computing system comprising:
a first computing device including a first central processing unit (CPU), a first network processing unit (NPU) that is in communication with the first CPU, and auxiliary processing units for the first computing device; and
a second computing device including a second CPU, a second NPU that is in communication with the second CPU and the first NPU, and auxiliary processing units for the second computing device,
wherein the one of the auxiliary processing units of the first and second computing devices can communicate application data directly to another one of the auxiliary processing units of the first and second computing devices through at least one of the first and second NPUs using standard networking protocols, including Internet Protocol (IP), Transmission Control Protocol (TCP), and User Datagram Protocol (UDP), without involvement from either the first CPU or the second CPU,
wherein the first and second NPUs perceive the auxiliary processing units for the first computing device and the auxiliary processing units for the second computing device as separate network appliances that provide both local access and remote access in a distributed computing environment,
wherein the first NPU is logically separate from the first CPU, and
wherein the second NPU is logically separate from the second CPU.

12. The computing system according to claim 11, further comprising:
a first virtual port that communicates between the first CPU and the first NPU, wherein the first virtual port communicates with the first NPU as if the first NPU is an external network appliance, using standard networking protocols, and
a second virtual port that communicates between the second CPU and the second NPU, wherein the second virtual port communicates with the second NPU as if the second NPU is an external network appliance, using standard networking protocols.

13. The computing system according to claim 12, wherein each of the first and second NPUs is configured as a network router that can route packets received from a transmitting unit to a receiving unit.

14. The computing system according to claim 13, wherein the transmitting unit is one of the first and second NPUs.

15. The computing system according to claim 13, wherein the receiving unit is one of the first and second NPUs.

16. In computer having a central processing unit (CPU) and a chipset including a network processing unit (NPU) that is in communication with the CPU and at least first and second auxiliary processing units, a method of transporting a data packet associated with a software application from the first auxiliary processing unit to the second auxiliary processing unit, comprising the steps of:
transmitting the data packet from first auxiliary processing unit using standard networking protocols, including Internet Protocol (IP), Transmission Control Protocol (TCP), and User Datagram Protocol (UDP), without involvement from the CPU;
receiving the data packet at the NPU;
routing the data packet to the second auxiliary processing unit; and
receiving the data packet at the second auxiliary processing unit,
wherein the CPU is bypassed in the transport path from the first auxiliary processing unit to the second auxiliary processing unit,
wherein the NPU perceives the first and second auxiliary processing units as separate network appliances that provide both local access and remote access in a distributed computing environment, and
wherein the NPU is logically separate from the CPU.

17. The method according to claim 16, wherein the CPU communicates with the NPU using a virtual port such that the virtual port communicates with the NPU as if the NPU is an external network appliance, using standard networking protocols.

18. The method according to claim 17, further comprising the step of carrying out one of various processing accelerations on the data packet at the NPU.

19. The method according to claim 18, wherein the processing accelerations include authentication, encryption, compression, and encapsulation.

20. The method according to claim 16, wherein each of the first auxiliary processing unit and the second auxiliary processing unit comprises a graphics processing unit, a storage processing unit, an audio processing unit, a video processing unit, a physics processing unit, or a network processing unit.

21. A distributed network of processing units for interacting with at least one host that comprises a central processing unit (CPU) executing a host operating system, the distributed network comprising:
a network processing unit (NPU) implemented on a chipset; and
at least one auxiliary processing unit,
wherein the NPU and the at least one auxiliary processing unit bypass the host operating system and communicate application data directly to each other using standard networking protocols, including Internet Protocol (IP), Transmission Control Protocol (TCP), and User Datagram Protocol (UDP), without involvement from the CPU and without involvement from the host operating system,
wherein the NPU perceives the at least one auxiliary processing unit as a separate network appliance that provides both local access and remote access in a distributed computing environment, and wherein the NPU is logically separate from the host operating system and the CPU.

22. The network of claim 21, wherein said at least one auxiliary processing unit is implemented on a chipset.

23. The network of claim 22, wherein said at least one auxiliary processing unit comprises a graphics processing unit, a storage processing unit, an audio processing unit, a video processing unit, a physics processing unit, or a network processing unit.

24. The computing device according to claim 1, wherein each of the first auxiliary processing unit and the second auxiliary processing unit comprises a storage processing unit, an audio processing unit, a video processing unit, a graphics processing unit, a physics processing unit, or a network processing unit.

25. The computing system according to claim 11, wherein each of the auxiliary processing units of the first and second computing devices comprises a storage processing unit, an audio processing unit, a video processing unit, a graphics processing unit, a physics processing unit, or a network processing unit.

* * * * *